United States Patent Office 3,312,427
Patented Apr. 4, 1967

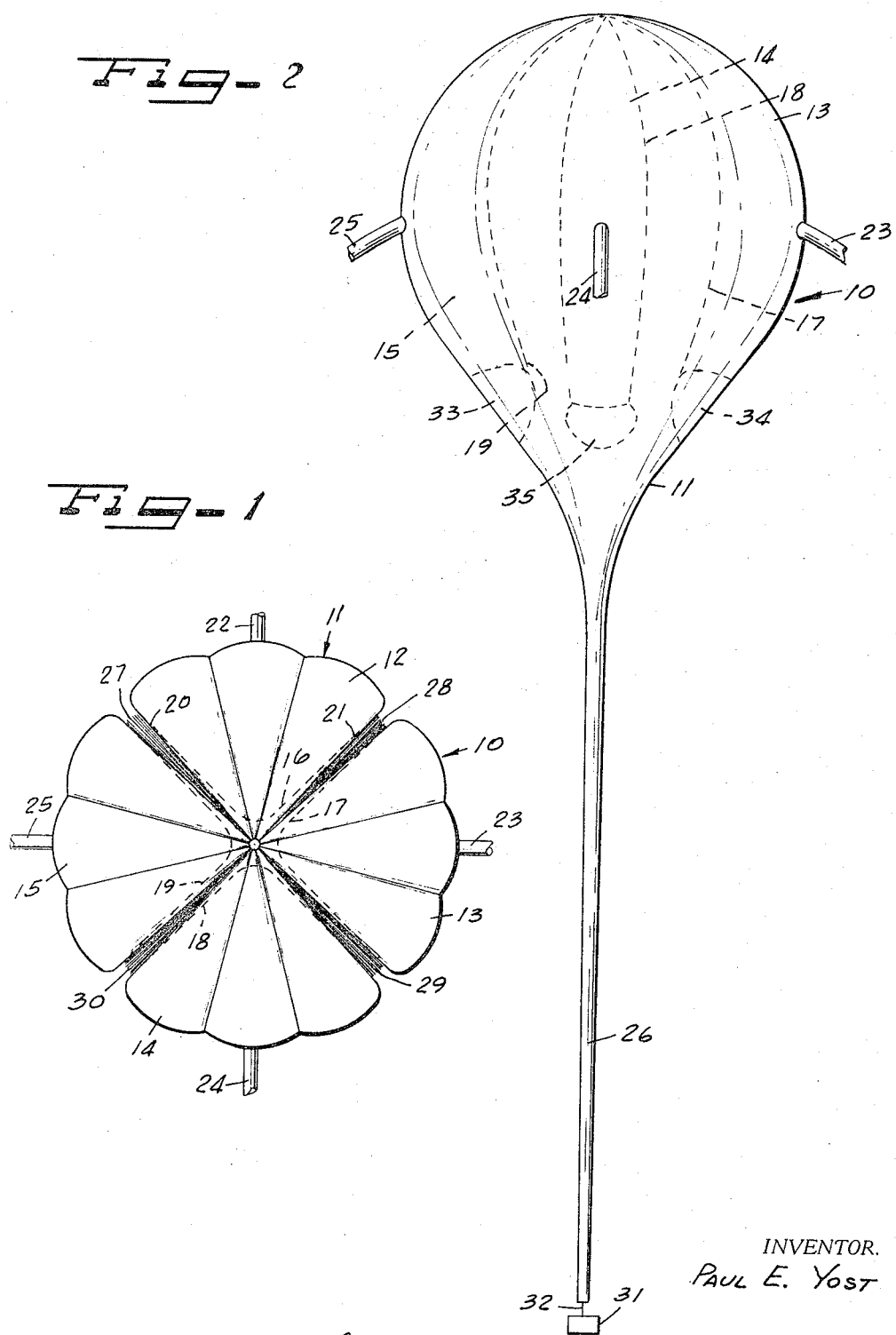

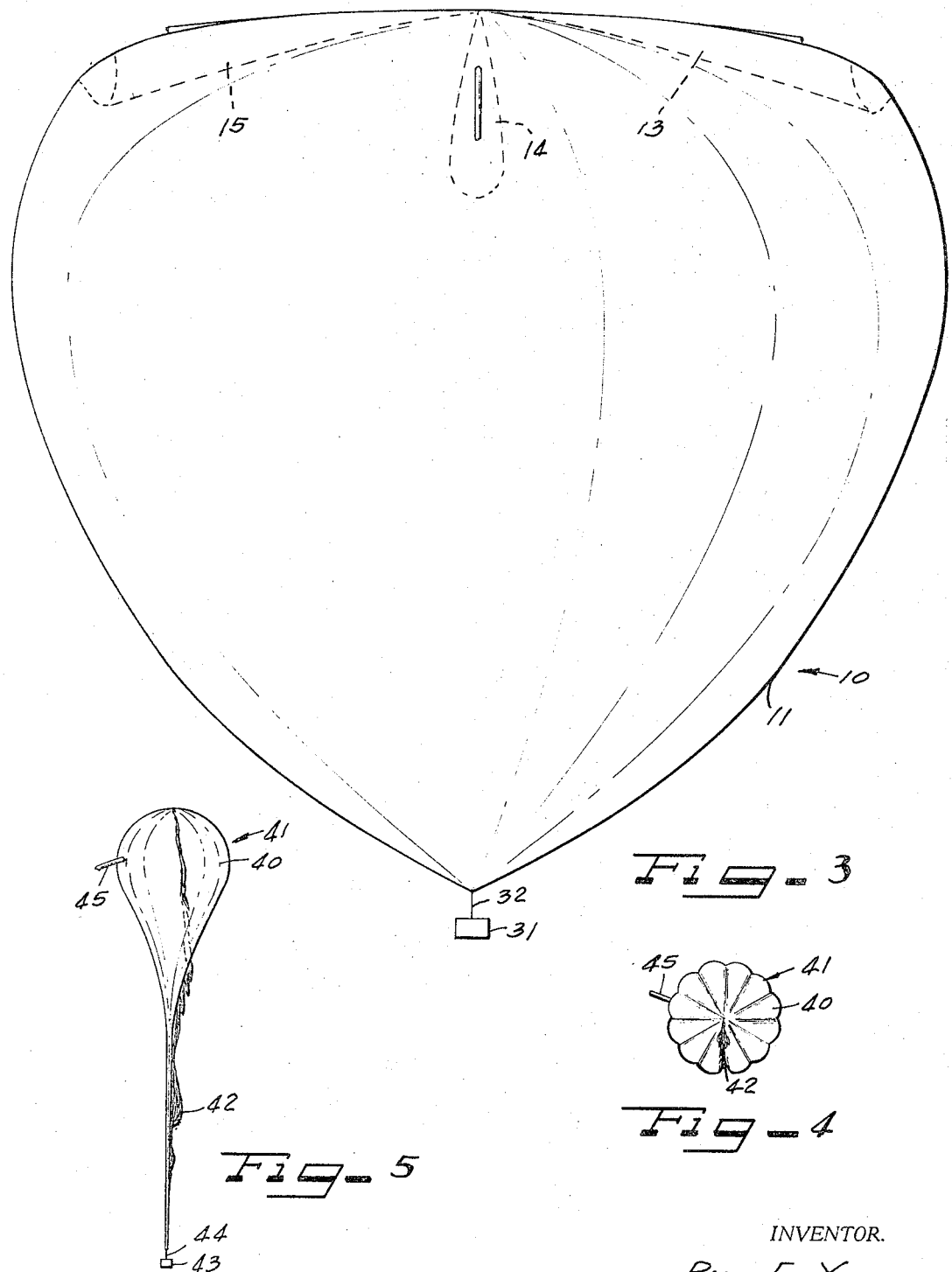

3,312,427
BALLOON STRUCTURE WITH
LAUNCHING CELLS
Paul E. Yost, Sioux Falls, S. Dak., assignor to Raven Industries, Inc., Sioux Falls, S. Dak., a corporation of South Dakota
Filed Mar. 8, 1965, Ser. No. 437,723
8 Claims. (Cl. 244—31)

The present invention relates to improvements in load carrying high altitude balloons and particularly to an improved balloon envelope structure capable of improving reliability by decreasing stresses during deployment.

The present invention is used primarily with balloons formed of lightweight flexible gas barrier materials such as polyethylene film or other plastics where the material may be formed in gores with the gores being attached to each other along seams to form the balloon envelope. Optimum designs are aimed at providing a shape for load carrying balloons wherein all stresses (and primarily vertical stresses) are nearly uniform. This can be accomplished when the balloon is fully inflated, but during launching and ascent, the balloon is not full and the design shape is not realized. This causes non-uniform stressing in the balloon.

It is recognized in the balloon art that at launching of a high altitude balloon a small gas bubble is usually formed at the upper ends thereof which has sufficient lifting capability to carry the weight of the balloon envelope material on the payload aloft at launching. This bubble expands as the balloon rises to higher altitudes. The balloon envelope material is bunched together and hangs downwardly from the bubble of gas in a draped manner at launching, and this bunch of material is commonly called the rope section.

As the lifting gas expands during ascension, more of the balloon material must be brought into use requiring deployment of the folds from the rope section. This creates tension in the material surrounding the inflated bubble which literally pulls the required envelope material from the rope section. If the strain were only in the tranverse direction the deployment would be easily accomplished without the problems of formations of excess localized stress. However, the rope section constitutes the major portion of the balloon envelope and the weight of this material is quite substantial hanging downwardly from the balloon envelope top and creating a downward stress. As the gas expansion occurs, the required material must be brought into position by a vertical lifting force as well as a horizontal force. The tension across the thin envelope film caused by lifting this relatively heavy mass of slack material in many cases may result in rupture of the balloon. While a balloon can be constructed and designed for optimum load carrying ability, maximum stress at floating altitudes with the entire strength of the balloon material used for load carrying capacity is ideal. However, nonuniform excess stresses caused as the balloon inflates when the gas expands make optimum design impossible. With the rope of material normally gathering at one side of the balloon a single layer of material exists at the other side and the range of stresses and maximum stress in a particular location cannot be accurately calculated or predicted because of the randomness of the drape pattern and the location of the drape. Most balloon failures occur at mid-altitudes, during ascent, and it is suspected that the unequal stressing is a very important contributing factor (with load temperature effects) to balloon failure. If difficulties in launching and expansion at low altitudes can be avoided, a balloon can be used to carry a payload approaching 100% of its total load carrying ability. That is, the balloon can be used to carry a payload approaching 100% of its total load carrying ability with greater reliability.

It is accordingly an object of the present invention to provide an improved balloon envelope construction wherein localized overstressing of balloon material due to pulling of the material from a single gathered rope as the gas expands is avoided.

An important object of the invention is to provide a method and structure wherein the new existing single rope section will be divided during launch into multiple groupings of folds of excess material of substantially smaller size and weight than the single rope section thereby reducing the strain required for material deployment.

In a preferred embodiment, the invention provides a plurality of separate bubbles or compartments within the balloon envelope radially spaced from the balloon axis and substantially uniformly circumferentially spaced with the excess material of the balloon envelope forming in groupings between the compartments. As the gas expands, it escapes from the compartments into the main balloon envelope and material is deployed from each of the groupings which are considerably smaller than the usual single rope section and which therefore do not encounter the twisting and entanglement of a single rope section and which provide a plurality of locations from which provide a plurality of locations from which materials can be drawn as the gas bubble expands.

Other objects, advantages and features will become more apparent with the teaching of the principles of the invention in connection with the disclosure of the preferred embodiments thereof in the specification, claims and drawings, in which:

FIGURE 1 is a top plan view, somewhat schematically shown, of a high altitude balloon embodying the principles of the present invention, as it appears at launching;

FIGURE 2 is a schematic side elevational view of the balloon as it appears at launching;

FIGURE 3 is a side elevational view of the balloon as it appears at high altitudes after it has been inflated by the expansion of the lifting gas therein;

FIGURE 4 is a top plan view of a balloon of the type heretofore conventionally used; and FIGURE 5 is a side elevational view of the conventional balloon of FIGURE 4.

On the drawings:

FIGURES 1 and 2 show a balloon envelope 10 at a launch and at low altitude. The balloon envelope is formed of a lightweight thin flexible material 11 usually of a flexible plastic film such as lightweight polyethylene on the order of 1 mil in thickness. As shown in FIGURES 2 and 3, a payload 31 is supported beneath the balloon envelope by load lines 32 suitably attached at the lower end of the balloon.

At launch and at low altitudes, the balloon and its load are supported by a bubble of lifting gas in the upper end which is of considerably smaller volume than the entire balloon envelope. As the balloon ascends to high altitudes, this bubble expands until the balloon is fully inflated to the condition shown in FIGURE 3 and the volume of the balloon envelope is designed so that it will have adequate lift to support the payload 31 at the desired altitude.

At the upper end of the balloon envelope 10 are a plurality of cells or compartments 12, 13, 14, and 15. These cells are radially spaced from the center axis of the balloon and substantially uniformly circumferentially spaced. Different numbers of compartments may be provided depending upon the size of balloons used, but four compartments have been found to be well suited for most purposes and advantageous therefor. Each compartment is formed in a similar manner and, as shown in FIGURES 1 and 2, may be formed by providing a cell or compartment wall 16, 17, 18 and 19. These cells take up only a portion of the total circumference of the balloon. At the top of the balloon, they take up a considerable fraction of the entire circumference (e.g., ½ to ⅓ of the total, but the ratio in some circumstances can vary and be even less), but extend downwardly of somewhat uniform size so that as the balloon circumference increases, the horizontal length of balloon wall between the cells increases. The balloon wall material between the cells will drape itself into groupings and these groupings will extend downwardly for the full length of the balloon. The groupings are shown at 27, 28, 29 and 30.

The cells are shown provided with thin layers or walls of material extending into the balloon and the walls such as 16, FIGURE 1, may be attached at their edges 20 and 21 to the inner wall surface of the balloon. The cells are open at their lower end with openings shown in FIGURE 2 at 33, 34 and 35. The openings permit the escape of lifting gas into the interior of the balloon envelope as the gas expands when the balloon ascends.

The walls 16, 17, 18 and 19 for each of the cells are of lightweight flexible material which may be the same as the material of the balloon envelope or it may be of even lighter weight since they function merely to divide the initial bubble of lifting gas into cells or compartments. When the balloon becomes fully inflated at higher altitudes, such as shown in FIGURE 3, the cell walls are merely suspended at the top of the balloon forming substantially no function.

For convenience of inflation, each cell is provided with its own inflation conduit, 22, 23, 24 and 25. These conduits may be connected to a single main supply conduit or preferably individually inflated on the ground. For the purposes of best initial inflation, each of the four cells can be inflated at the same time and the groupings of folds of excess balloon material will form between the cells as at 27, 28, 29 and 30. These groupings tend to continue all of the way down for the full length of the material to the trailing lower end portion 26 shown in FIGURE 2.

The individual inflation conduits 22, 23, 24 and 25 may be the full length of the balloon if they are attached to the side wall thereof, but preferably are in short lengths and sealed off to lay against the outer surface of the balloon when it is fully inflated, as shown in FIGURE 3.

The individual cells 12, 13, 14 and 15 are of an adequate length so that they tend to keep the excess material in groupings as the gas in the upper end of the balloon expands. Also, the lower end of the cells should be sufficiently separated so that the groupings of excess material will readily form between them, and their total volume should be adequate to contain most of the initial bubble of air required to carry the balloon and its load aloft.

In operation, each of the four cells 12, 13, 14 and 15 is inflated at launch with the excess balloon material forming in groupings or folds 27, 28, 29 and 30 between the cells.

The cells are substantially fully inflated and any excess gas will flow out through the open lower ends 33, 34 and 35 of the cells. As the balloon is launched and rises to higher altitudes at lower atmospheric pressures, the expanding gas within the cells flows out through the lower ends to fill the balloon envelope and the additional material pulled from the envelope to permit expansion is substantially uniformly supplied from each of the separate groupings 27, 28, 29 and 30 of folds. Thus, not only is the extra material for expansion supplied from a plurality of sources to avoid the stress which occurs when the material must be pulled from any one source, but also each of the groupings or rope sections are only a fraction of the size of a single rope section thereby greatly reducing entanglement and twisting.

The individual cells have operated in accordance with the method of the invention to group the excess material into a plurality of separated groupings of substantially uniform size around the balloon axis with each grouping containing a proportional quantity of excess material. At launch, vertical lifting forces are applied by the cells at evenly circumferentially spaced locations radial of the balloon axis so that the excess material gathers in the groupings between the lifting locations. The material is deployed substantially uniform from each of the groupings as the balloon inflates at higher altitudes and lower atmospheric pressures.

FIGURES 4 and 5 illustrate a standard or conventional high altitude balloon 41 wherein the initial gas bubble 40 forms at the upper end of the balloon. The excess material forms a rope 42 which substantially always collects at one lateral location on the balloon. As the gas bubble expands, the extra material required must be pulled from this single rope section 42. Initial inflation is through a single tube 45 leading into the bubble 40 at the top. The weight of a load 43 suspended by line 44 at the lower end of the balloon creates a continuous vertical tension in the rope section 42 making its deployment even more difficult.

Thus, it will be seen that I have provided an improved balloon structure and method of launching and constructing a balloon which meets the objectives, advantages and features of the above invention. The structure adds very little additional weight to a balloon and does not interfere with its normal performance at floating altitudes. Simplified and more safe launching is accomplished. Also, improved inflation is accomplished preventing the difficulties of the gathering folds of material and permitting simplified inflation through a number of inflation tubes. The multi-cell construction is easy and inexpensive to achieve and designs are possible which approach 100% carrying capacity of the material employed.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A high altitude balloon structure for carrying a load aloft comprising in combination,
  a balloon envelope formed of a lightweight thin flexible material being of a size to support a load at high altitudes,
    said envelope being inflatable with a small volume of lifting gas at the upper end to carry it aloft at launching and lower altitudes with the gas expanding to fill the balloon envelope at higher altitudes,
  a plurality of separate gas containing cells spaced circumferentially apart and located laterally of the balloon axis being at the upper end of the envelope,
    said cells coactingly supporting a grouping of balloon envelope folds suspended between adjacent cells so that the excess material is distributed at launch preventing excess stress,
  and means for supporting a load from the lower end of the balloon envelope.

2. A high altitude balloon structure for carrying a load aloft comprising in combination,
  a balloon envelope formed of a lightweight thin flexible material being of a size to support a load at high altitudes,
    said envelope being inflatable with a small volume of lifting gas at the upper end to carry it aloft at launching and lower altitudes with the gas expanding to fill the balloon envelope at higher altitudes,
  a plurality of separate gas containing cells spaced circumferentially apart and located laterally of the balloon axis being at the upper end of the envelope.
    said cells coacting for supporting a grouping of balloon envelope folds suspended between adjacent cells so that the excess material is distributed at launch preventing excess stress,
a lower vent in each of the cells permitting the flow of gas into the balloon envelope as the balloon ascends and the gas expands,
and means for supporting a load from the lower end of the balloon envelope.

3. A high altitude balloon structure for carrying a load aloft comprising in combination,
a balloon envelope formed of a lightweight thin flexible material being of a size to support a load at high altitudes,
said envelope being inflatable with a small volume of lifting gas at the upper end to carry it aloft at launching and at lower altitudes with the gas expanding to fill the balloon envelope at higher altitudes,
means dividing and holding the slack material of the envelope below said upper end into a plurality of separate groupings of slack material as the balloon rises, means providing a separate gas containing lifting cell between each of the groupings,
and means for supporting a load from the lower end of the balloon envelope.

4. A high altitude balloon structure for carrying a load aloft comprising in combination,
a balloon envelope formed of a lightweight thin flexible material being of a size to support a load at high altitudes,
said envelope being inflatable with a small volume of lifting gas at the upper end to carry it aloft at launching and lower altitudes with the gas expanding to fill the balloon envelope at higher altitudes,
a plurality of separate gas containing cells spaced circumferentially apart and located laterally of the balloon axis being at the upper end of the envelope,
adjacent cells supporting a grouping of balloon envelope folds between them suspended therebeneath so that the excess material is distributed at launch preventing excess stress,
a lower vent in each of the cells permitting the flow of gas into the balloon envelope as the balloon ascends and the gas expands,
separate inflation conduits communicating with each of said cells,
and means for supporting a load from the lower end of the balloon envelope.

5. A high altitude balloon structure for carrying a load aloft comprising in combination,
a balloon envelope formed of a lightweight thin flexible material of a size to support a load at high altitudes,
said envelope being inflatable with a small volume of lifting gas at the upper end to carry it aloft at launching and at lower altitudes with the gas expanding to fill the balloon envelope at higher altitudes,
a plurality of separate cells within the balloon envelope radially spaced to the balloon axis and substantially uniformly circumferentially spaced,
said cells formed by separate walls of thin lightweight flexible material attached at their edges to the inner surface of the balloon envelope and being open at the lower ends thereof communicating with the envelope for the transfer of expanding gas from the cells to the envelope,
and means for supporting a load from the lower end of the balloon envelope.

6. A high altitude balloon structure for carrying a load aloft comprising in combination,
a balloon envelope formed of a lightweight thin flexible plastic material having a volume adequate to support a load at high altitude,
said envelope being inflatable with a small volume of lifting gas at the upper end to carry it aloft at launching and low altitudes with the gas expanding and filling the balloon envelope at higher altitudes,
individual separate cells within the balloon envelope radially spaced to the balloon axis and circumferentially substantially uniformly spaced,
means for permitting gas to escape from the separate cells as the balloon is ascending,
means for individually inflating said separate cells with lifting gas so that excess material of the envelope will depend downwardly between said cells during launch and at lower altitudes,
and means for supporting a load from the lower end of the balloon envelope.

7. The method of preventing overstressing and failure of excess balloon envelope material at launch in a high altitude balloon which comprises, grouping the excess material into a plurality of separated groupings of substantially uniform size around the balloon circumference at launch with each grouping containing a proportional quantity of the excess material applying a plurality of separate lifting forces with a force applied between each of the groupings so that the material is deployed from each grouping as the balloon inflates at higher altitudes and each grouping grows progressively smaller until full inflation is achieved.

8. The method of preventing overstressing and failure of the excess balloon envelope material at launch in a high altitude balloon which comprises, providing lifting forces at launching at substantially evenly circumferentially spaced separate locations radial of the balloon axis at the upper end thereof with excess balloon envelope material arranged and gathered in groupings between said locations so that the formation of a single twisted rope of material is prevented at launching and at lower altitudes, with the material deploying from the groupings as the balloon inflates at higher altitudes.

References Cited by the Examiner

UNITED STATES PATENTS

| | | | |
|---|---|---|---|
| 2,635,835 | 4/1953 | Dungan et al. | 244—31 |
| 2,886,263 | 5/1959 | Ferguson | 244—31 |
| 3,226,060 | 12/1965 | Winker | 244—31 |

MILTON BUCHLER, *Primary Examiner.*
T. MAJOR, *Assistant Examiner.*